United States Patent
Ayoub et al.

(10) Patent No.: US 9,965,906 B2
(45) Date of Patent: May 8, 2018

(54) SYSTEM AND METHOD FOR PROVIDING CONTENT TO VEHICLES IN EXCHANGE FOR VEHICLE INFORMATION

(71) Applicant: GOOGLE TECHNOLOGY HOLDINGS LLC, Mountain View, CA (US)

(72) Inventors: Ramy P. Ayoub, Arlington Heights, IL (US); Robert F. D'Avello, Lake Zurich, IL (US); Gus S. Giunta, Wauconda, IL (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 0 days. days.

(21) Appl. No.: 15/050,053

(22) Filed: Feb. 22, 2016

(65) Prior Publication Data

US 2016/0171800 A1   Jun. 16, 2016

Related U.S. Application Data

(63) Continuation of application No. 11/289,047, filed on Nov. 29, 2005, now Pat. No. 9,269,265.

(51) Int. Cl.
*G01M 17/00* (2006.01)
*G07C 5/08* (2006.01)
(Continued)

(52) U.S. Cl.
CPC .......... *G07C 5/0816* (2013.01); *B60N 2/002* (2013.01); *G06F 21/10* (2013.01);
(Continued)

(58) Field of Classification Search
CPC .. B60R 2021/0004; B60R 2021/23107; B60R 2021/23153; B60R 2021/23161
(Continued)

(56) References Cited

U.S. PATENT DOCUMENTS 4,768,088 A    8/1988  Ando
5,333,421 A *  8/1994  McKenna ............. E04B 1/3205
                                                   52/63
(Continued)

FOREIGN PATENT DOCUMENTS

JP    2004-326470 A    11/2004
JP    2005-051731 A     2/2005
(Continued)

OTHER PUBLICATIONS

Office Action, Japanese App. No. 2008-543552 (Foreign Text), dated Mar. 1, 2011.

*Primary Examiner* — Redhwan K Mawari
(74) *Attorney, Agent, or Firm* — Marshall, Gerstein & Borun LLP

(57) ABSTRACT

A system and method for providing content from a source to a vehicle is disclosed. The content is restricted by associating the content with at least one requirement for vehicle information from a vehicle to which the content is provided. When restricted content is requested, a vehicle system obtains vehicle related information from the vehicle. The vehicle information is transferred to the vehicle system from the source, and the restricted content is transferred from the source to the vehicle system. The vehicle system, the source, or both determine whether the vehicle information meets the at least one requirement restricting the content. As long as the requirement for vehicle information is met, processing of the restricted content is allowed.

15 Claims, 7 Drawing Sheets

(51) Int. Cl.
*G06F 21/10* (2013.01)
*G08G 1/0968* (2006.01)
*H03J 1/00* (2006.01)
*B60N 2/00* (2006.01)
G07C 5/00 (2006.01)

(52) U.S. Cl.
CPC . *G08G 1/096811* (2013.01); *G08G 1/096872* (2013.01); *G08G 1/096877* (2013.01); *H03J 1/0025* (2013.01); *G06F 2221/2111* (2013.01); *G07C 5/008* (2013.01)

(58) Field of Classification Search
USPC .................................................... 701/31.4
See application file for complete search history.

(56) References Cited

U.S. PATENT DOCUMENTS

| | | | | |
|---|---|---|---|---|
| 5,404,443 | A * | 4/1995 | Hirata | G06F 3/0489 701/36 |
| 5,442,553 | A * | 8/1995 | Parrillo | G06F 8/65 455/420 |
| 5,528,698 | A | 6/1996 | Kamei et al. | |
| 5,850,254 | A | 12/1998 | Takano et al. | |
| 6,005,958 | A | 12/1999 | Farmer et al. | |
| 6,029,110 | A | 2/2000 | Zuber et al. | |
| 6,154,658 | A | 11/2000 | Caci | |
| 6,212,408 | B1 | 4/2001 | Son et al. | |
| 6,304,173 | B2 | 10/2001 | Pala et al. | |
| 6,374,177 | B1 * | 4/2002 | Lee | G01C 21/32 340/988 |
| 6,459,974 | B1 | 10/2002 | Baloch et al. | |
| 6,480,616 | B1 | 11/2002 | Hata et al. | |
| 6,493,620 | B2 | 12/2002 | Zhang | |
| 6,608,910 | B1 | 8/2003 | Srinivasa et al. | |
| 6,678,591 | B2 * | 1/2004 | Ohmura | G07C 5/0808 701/31.4 |
| 6,690,268 | B2 | 2/2004 | Schofield et al. | |
| 6,732,032 | B1 * | 5/2004 | Banet | G01M 15/102 701/31.4 |
| 6,738,697 | B2 * | 5/2004 | Breed | B60C 11/24 701/31.5 |
| 6,847,872 | B2 * | 1/2005 | Bodin | G06Q 10/02 340/438 |
| 6,856,873 | B2 | 2/2005 | Breed et al. | |
| 6,961,443 | B2 | 11/2005 | Mahbub | |
| 6,968,073 | B1 | 11/2005 | O'Boyle et al. | |
| 6,988,033 | B1 * | 1/2006 | Lowrey | G08G 1/20 340/439 |
| 7,028,304 | B1 * | 4/2006 | Weinberger | G06Q 10/10 709/227 |
| 7,035,631 | B2 * | 4/2006 | Schwinke | H04M 3/38 455/418 |
| 7,043,699 | B2 * | 5/2006 | Obradovich | B60R 16/0231 701/36 |
| 7,212,916 | B2 * | 5/2007 | Alewine | G07C 5/008 701/117 |
| 7,262,790 | B2 | 8/2007 | Bakewell | |
| 9,269,265 | B2 | 2/2016 | Ayoub et al. | |
| 2001/0014884 | A1 * | 8/2001 | Dillard | G06F 21/10 705/57 |
| 2002/0013815 | A1 | 1/2002 | Obradovich et al. | |
| 2002/0049620 | A1 | 4/2002 | Uchida et al. | |
| 2002/0059022 | A1 | 5/2002 | Breed et al. | |
| 2002/0070852 | A1 * | 6/2002 | Trauner | B60R 16/0373 340/438 |
| 2002/0116106 | A1 | 8/2002 | Breed et al. | |
| 2003/0214585 | A1 | 11/2003 | Bakewell | |
| 2003/0231208 | A1 | 12/2003 | Hanon et al. | |
| 2004/0006541 | A1 | 1/2004 | Huddelston et al. | |
| 2004/0059498 | A1 * | 3/2004 | Chinomi | G01C 21/3682 701/516 |
| 2004/0145470 | A1 | 7/2004 | Fager et al. | |
| 2004/0254886 | A1 * | 12/2004 | Siepen | G07B 15/063 705/51 |
| 2005/0080606 | A1 | 4/2005 | Ampunan et al. | |
| 2005/0256616 | A1 | 11/2005 | Rhoads | |
| 2005/0270146 | A1 | 12/2005 | Enya et al. | |
| 2006/0047426 | A1 | 3/2006 | Vitito | |
| 2006/0047602 | A1 | 3/2006 | Grace et al. | |
| 2006/0167784 | A1 | 7/2006 | Hoffberg | |
| 2006/0177101 | A1 | 8/2006 | Kato et al. | |
| 2006/0178814 | A1 | 8/2006 | Everett | |
| 2007/0025597 | A1 | 2/2007 | Breed et al. | |
| 2007/0086624 | A1 | 4/2007 | Breed et al. | |
| 2007/0120697 | A1 | 5/2007 | Ayoub et al. | |
| 2007/0124043 | A1 | 5/2007 | Ayoub et al. | |
| 2007/0124044 | A1 | 5/2007 | Ayoub et al. | |
| 2007/0124045 | A1 | 5/2007 | Ayoub et al. | |
| 2007/0124046 | A1 * | 5/2007 | Ayoub | G06F 21/10 701/36 |
| 2007/0156317 | A1 | 7/2007 | Breed | |

FOREIGN PATENT DOCUMENTS

| | | |
|---|---|---|
| JP | 2005-196635 A | 7/2005 |
| WO | WO-2004/111880 A1 | 12/2004 |

\* cited by examiner

SYSTEM AND METHOD FOR PROVIDING CONTENT TO VEHICLES IN EXCHANGE FOR VEHICLE INFORMATION

CROSS-REFERENCE TO RELATED APPLICATIONS

This application is a continuation of and claims priority to U.S. application Ser. No. 11/289,047, filed on Nov. 29, 2005, entitled "System and Method for Providing Content to Vehicles in Exchange for Vehicle Information," the entire disclosure of which is hereby expressly incorporated by reference herein. Additionally, U.S. Patent Applications entitled: "System and Method for Controlling the Processing of Content Based on Vehicle Conditions," U.S. patent application Ser. No. 11/288,841, filed Nov. 29, 2005; "System and Method for Controlling the Processing of Content Based on Zones in Vehicles," U.S. patent application Ser. No. 11/289,046, filed Nov. 29, 2005; "System and Method for Modifying the Processing of Content Based on Vehicle Conditions," U.S. patent application Ser. No. 11/288,701, filed Nov. 29, 2005; and "Method and Device for Determining a Location and Orientation of a Device in a Vehicle," U.S. patent application Ser. No. 11/288,475, filed Nov. 29, 2005, are incorporated herein by reference.

FIELD OF THE DISCLOSURE

The subject matter of the present disclosure relates to systems and methods for handling content in vehicles.

BACKGROUND OF THE DISCLOSURE

Vehicles can have several types of devices for processing content. Some examples of devices include conventional radios, satellite radios, audio systems, video systems, entertainment systems, Telematics systems, and navigations systems. The devices can be installed in the vehicle when manufactured or can be aftermarket units added later in the vehicle. The devices can handle various forms of content, such as media, audio, video, radio broadcast, satellite broadcast, television broadcast, Global Position System (GPS) data, and navigation data. To deliver the content to a passenger in the vehicle, the devices have certain processing capabilities, such as storing, rendering, encoding, decoding, transcoding, parsing, encrypting, decrypting, streaming, communicating, and playing capabilities.

Providers of digital media, such as music and videos, use several techniques to restrict or control the acquisition, storage, transfer, and/or processing of the digital media. These restrictive techniques can be referred to as Digital Rights Management (DRM) schemes. Some examples of restrictive techniques include Serial Copy Management System (SCMS), Macrovision, Helix DRM, Steam, iTunes™ (which incorporates Apple's FairPlay DRM for content downloaded through the iTunes™ Music Store), Windows Media DRM (WMDRM) that protects Windows Media Audio or Video content and is implemented in Windows Media Player, OMA DRM system used by the Open Mobile Alliance, Real Networks, Sony's DRM technology OpenMG, MMK Secure Stream, Digital Transmission Content Protection (DTCP), Content Protection for Recordable Media (CPRM), High-Bandwidth Digital Content Protection (HDCP), and Digital Transmission Copy Protection over Internet Protocol (DTCP-IP).

Figure 1:
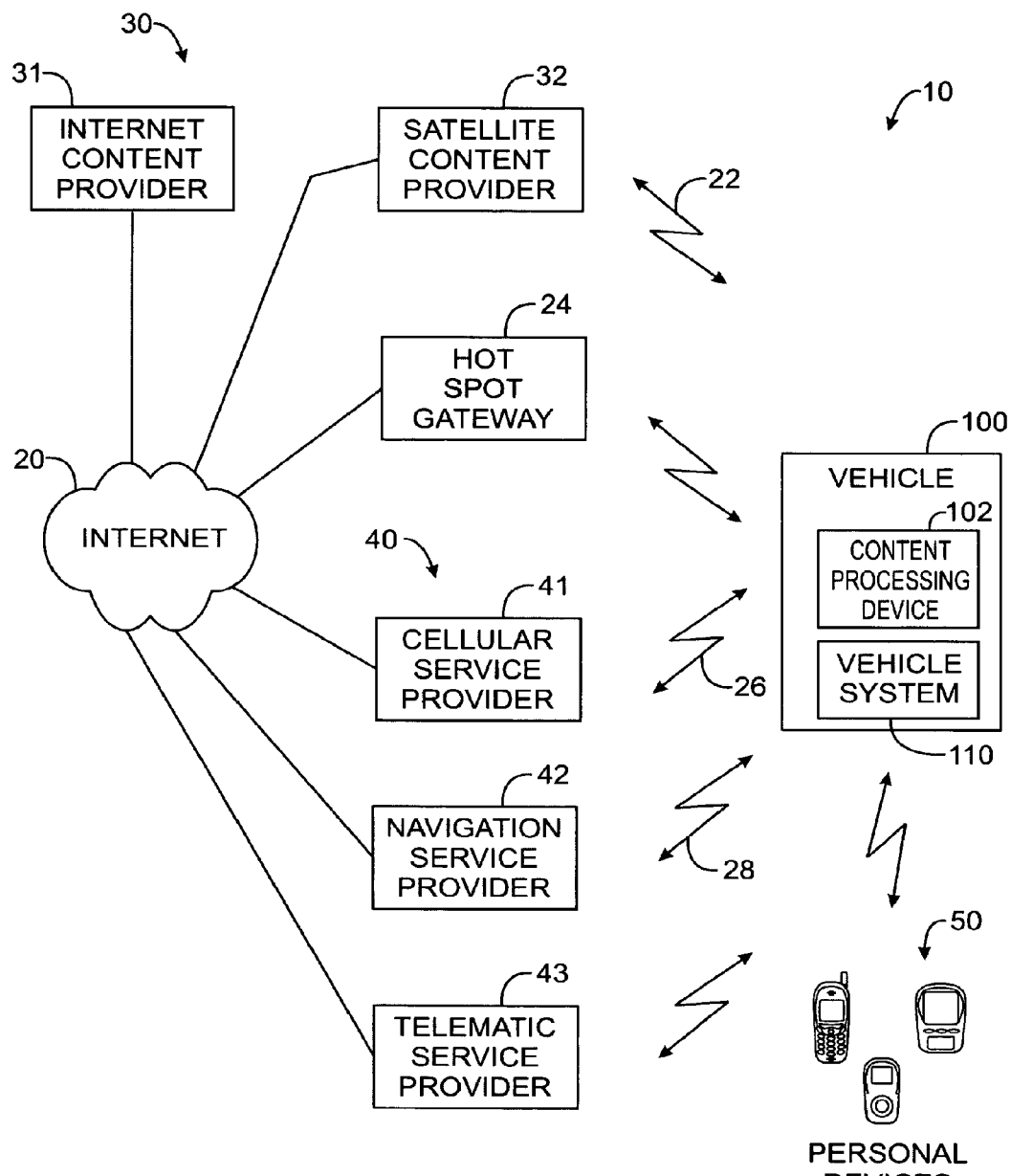
FIG. 1 illustrates a network according to certain teachings of the present disclosure.

While the subject matter of the present disclosure is susceptible to various modifications and alternative forms, specific embodiments thereof have been shown by way of example in the drawings and are herein described in detail. The figures and written description are not intended to limit the scope of the inventive concepts in any manner. Rather, the figures and written description are provided to illustrate the inventive concepts to a person skilled in the art by reference to particular embodiments, as required by 35 U.S.C. § 112.

DETAILED DESCRIPTION

Systems and methods for handling content for a vehicle are disclosed. One technique of handling content involves controlling how content is acquired and provided to a vehicle system. In this technique, a source, such as a content or service provider, provides content to the vehicle system in exchange for vehicle information transferred from the vehicle to the source. To do this, content is restricted by requiring at least one transfer of vehicle related information. When restricted content is requested at the vehicle, the vehicle system obtains information of the vehicle. The vehicle information is transferred from the vehicle system to the source, and the restricted content is transferred from the source to the vehicle system for processing of the content. The source and/or the vehicle system determines whether the vehicle information meets the requirement for the at least one transfer of vehicle information restricting the content. As long as the requirement for vehicle related information is met, processing of the restricted content is allowed.

Another technique of handling content for a vehicle involves controlling the conditions under which content can be processed in the vehicle. To do this, content is restricted with a requirement of at least one vehicle condition. When processing of the restricted content is requested, the vehicle system obtains vehicle information using a vehicle interface or an On-Board Diagnostic II (OBD-II) connection communicatively coupled to a vehicle bus, for example. The vehicle system then determines whether the vehicle information meets the requirement of the vehicle condition restricting the content. If the requirement is met, a content processing device is allowed to process the restricted content. Otherwise, the content processing device is prevented from processing the restricted content.

Another technique of handling content for a vehicle involves controlling the locations in which the content can be processed in the vehicle. To do this, processing of the content is restricted to at least one predefined zone within the vehicle. When a request to process the restricted content is received, the vehicle system obtains zone information of the vehicle and determines whether the necessary content processing device is designated for the predefined zone. For example, the predefined zones can include a zone A for the front seat driver side, a zone B for the front seat passenger side, a zone C for the backseat driver side, and a zone D for the backseat passenger side of the vehicle. Processing of the content may be restricted to zones C and D of the vehicle only, for example. The content processing device, such as a video system, may be located in the area of the backseat of the vehicle and may be designated for zones C and D. Thus, the vehicle system would determine that the necessary content processing device is designated for the predefined zone. Alternatively, the vehicle system determines whether the predefined zone is occupied by a passenger. For example, a sensor in the vehicle senses if a seat in the predefined zone is occupied. If the content processing device is designated for the predefined zone or the zone is occupied, then the content processing device is allowed to process the restricted content. Otherwise, the content processing device is not allowed to process the restricted content.

Yet another technique of handling content for a vehicle involves modifying how content is processed in the vehicle based on current vehicle conditions. To do this, the processing of content is enabled or configured with at least two modes of operation based on vehicle conditions. During operation, the vehicle system obtains vehicle information. The vehicle system then determines whether the vehicle information meets one of the vehicle conditions, and the content is processed in the mode corresponding to the vehicle condition that is met.

The foregoing is not intended to summarize each potential embodiment or every aspect of the present disclosure. Let us now refer to the figures to describe the subject matter of the present disclosure in greater detail. Before discussing the various techniques of handling content summarized above, we will first turn to a network environment in which content is available for a vehicle system according to the present disclosure.

Referring to FIG. 1, a network 10 and a vehicle 100 according to certain teachings of the present disclosure are illustrated. The vehicle 100 has a vehicle system 110 incorporated into or added to the vehicle 100. The vehicle 100 also has one or more electronic systems or devices 102 available for vehicles for processing content, such as an entertainment system, an audio system, a video system, user interfaces, a navigation system, and a Telematics system. The content processing device 102 can be an independent component of the vehicle 100 or a component of the vehicle system 110.

The network 10 represents several possibilities of a network environment for the vehicle system 100. Various sources 30, 40, and 50 in the network 10 can provide content to the vehicle system 110 for processing. For example, some sources 30 of content can include content providers, such as an Internet content provider 31, a satellite content provider 32, a cable content provider (not shown), and a radio content provider (not shown). Other sources 40 of content can include service providers, such as a cellular service provider 41, a navigation service provider 42, and a Telematics service provider 43. Yet more sources 50 of content can include personal devices, such as a music server, a personal computer, a home entertainment system, a personal digital assistant (PDA), a digital music player, an iPod™, or a portable phone, for example.

Given these various sources 30, 40, and 50 of content, it will be appreciated that content as used herein not only refers to digital data, media data, multimedia data, audio data, and video data, but also refers to Internet data, cable broadcast data, radio broadcast data, satellite broadcast data, television broadcast data, GPS data, navigation data, user interface data, and software application data, as well as other possible types of data usable by vehicle system 110.

The various sources 30, 40, and 50 of content can provide that content to the vehicle system 110 via various communication paths, such as the Internet 20, satellite communications 22, hot spot gateways 24, cellular networks 26, and global positioning systems 28. In addition, other communication paths can include WiFi, BlueTooth™, Ultrawide Band (UWB), Universal Serial Bus (USB), and various communication paths known in the art.

Figure 2:
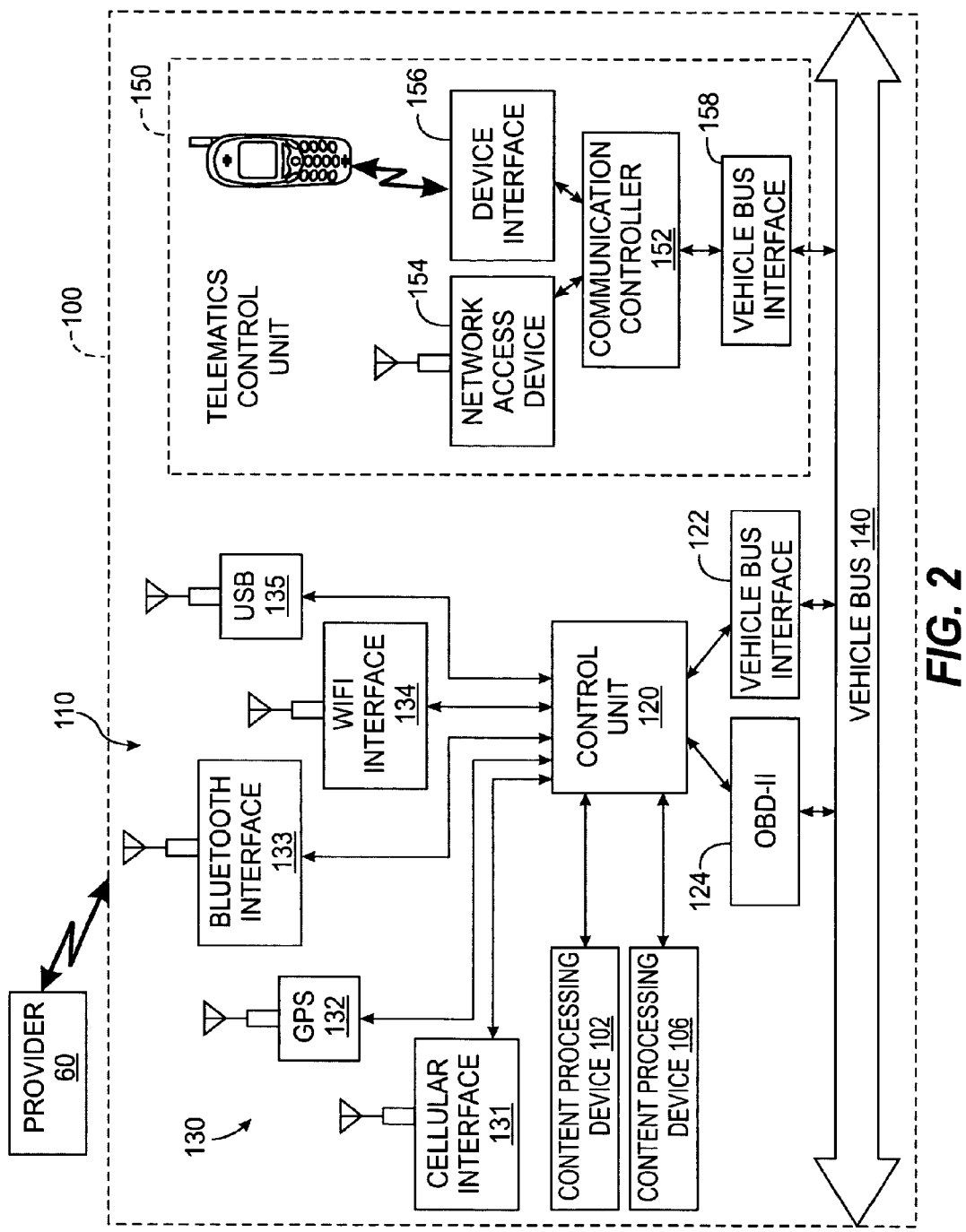
FIG. 2 illustrates a vehicle system according to certain teachings of the present disclosure.

With an understanding of the network environment available to the vehicle system 110 described above, we now turn to a discussion of the vehicle or multimedia system 110, which is illustrated in more detail in FIG. 2. The vehicle system 110 can be an in-cabin component or an aftermarket unit for the vehicle 100. In a general description, the vehicle system 110 is capable of communicating with external systems outside the vehicle 100, processing content in the vehicle 100, and communicating with other components within the vehicle 100.

The vehicle system 110 includes a control unit or controller 120 communicatively coupled to one or more content processing devices 102 and 106 in the vehicle 100. The controller 120 and devices 102 and 106 can share or divide features of their operation depending on a particular implementation of the system 110. For example, the content processing devices 102 and 106 can be capable of independent storage and processing of content but can be controlled by the controller 120. Alternatively, the content processing devices 102 and 106 may not be capable of independent storage and processing of content, and the controller 120 can handle the processing of content and can stream or otherwise send the processed content to the devices 102 and 106 for delivery or rendering in the vehicle 100.

To connect to the network environment and sources of content described previously, the controller 120 is communicatively coupled to one or more communication interfaces 130, which can include, but are not limited to, a cellular interface 131, a GPS interface 132, a BlueTooth™ interface 133, a WiFi interface 134, and a USB interface 135. A particular vehicle 100 may have one or more of these various interfaces 130. Using the interfaces 130, the controller 120 can communicate with other parts of a network and can obtain content from the various sources of content, such as described previously.

To obtain information related to the vehicle 100, the controller 120 is communicatively coupled to an electronic bus 140 of the vehicle 100, which is in turn coupled to various components (not shown) of the vehicle 100. Alternatively, the controller 120 is directly coupled to vehicle components. The vehicle components include those known in the art. Some examples of vehicle components include, but are not limited to, a diagnostic system, a vehicle computer or control unit (e.g., an Engine Control Unit), a transmission, an odometer, a vehicle module (e.g., a power steering control module, keyless entry module, door module, etc.), and a vehicle sensor (e.g., Differential Pressure Feedback EGR (DPFE) sensor, tire pressure sensor, oil pressure sensor, engine temperature sensor, etc.). In one example, a vehicle bus interface 122 couples the controller 120 to the vehicle bus 140. Such a vehicle bus interface 122 is known in the art and can allow direct communication between the controller 120 and the components of the vehicle 100 via the vehicle bus 140. The vehicle interface 122 may be suitable when the controller 120 is an integrated component of the vehicle 100 having direct access to the vehicle bus 140.

As a supplement or alternative to the vehicle bus 122, an On-Board Diagnostic connection 124, preferably an OBD-II connection, can couple the controller 120 to the vehicle bus 140, which may be suitable when the controller 120 is an aftermarket unit not originally integrated into the vehicle 100. If a vehicle bus interface 122 or OBD-II connection 124 is not available in the vehicle 100, other devices in the vehicle 100 can provide vehicle information to the controller 120. In one example, the GPS interface 132, which can be a receiver, can provide distance traveled, velocity, direction, time, and other travel related information to the controller 120.

In addition to the interfaces 130, the vehicle system 110 includes a Telematics control unit 150 for indirectly communicating with various network sources. The Telematics control unit 150 can be similar to that disclosed in U.S. patent application Ser. No. 11/118,528, filed Apr. 29, 2005, entitled "System and Method for Managing Content between Devices in Various Domains" which is incorporated herein by reference in its entirety. Briefly, the Telematics control unit 150 includes a communication controller 152 coupled to a network access device 154 for accessing a network, such as described previously. In addition, the Telematics control unit 150 includes a device interface 156 for communicating with an independent communication device, such as a cellular phone, which has access to a network. A vehicle bus interface 158 couples the Telematics control unit 150 to the vehicle bus 140. Although the vehicle system 110 in FIG. 2 is shown having the communication interfaces 130 and the Telematics control unit 150, the vehicle system 110 need not have both in a given implementation.

Now that details of a network environment, content, sources, and a vehicle system have been described above, we now turn to several techniques of handling content in a vehicle.

As previously mentioned, one technique of handling content for vehicle 100 involves controlling how content is provided to the vehicle system 110. In this technique, the sources 30, 40, and 50 of FIG. 1 transfer content (e.g., music, video, data, etc.) to the vehicle system 110 in exchange for information of the vehicle 100. In this arrangement, the content is restricted by a requirement for at least one transfer of vehicle related information, and the vehicle system 110 is required to provide the required information. Thus, to obtain the restricted content and/or to be able to process the restricted content, the vehicle system 110 enforces the requirement by providing the required vehicle information that the vehicle owner or driver has agreed to provide.

Figure 3:
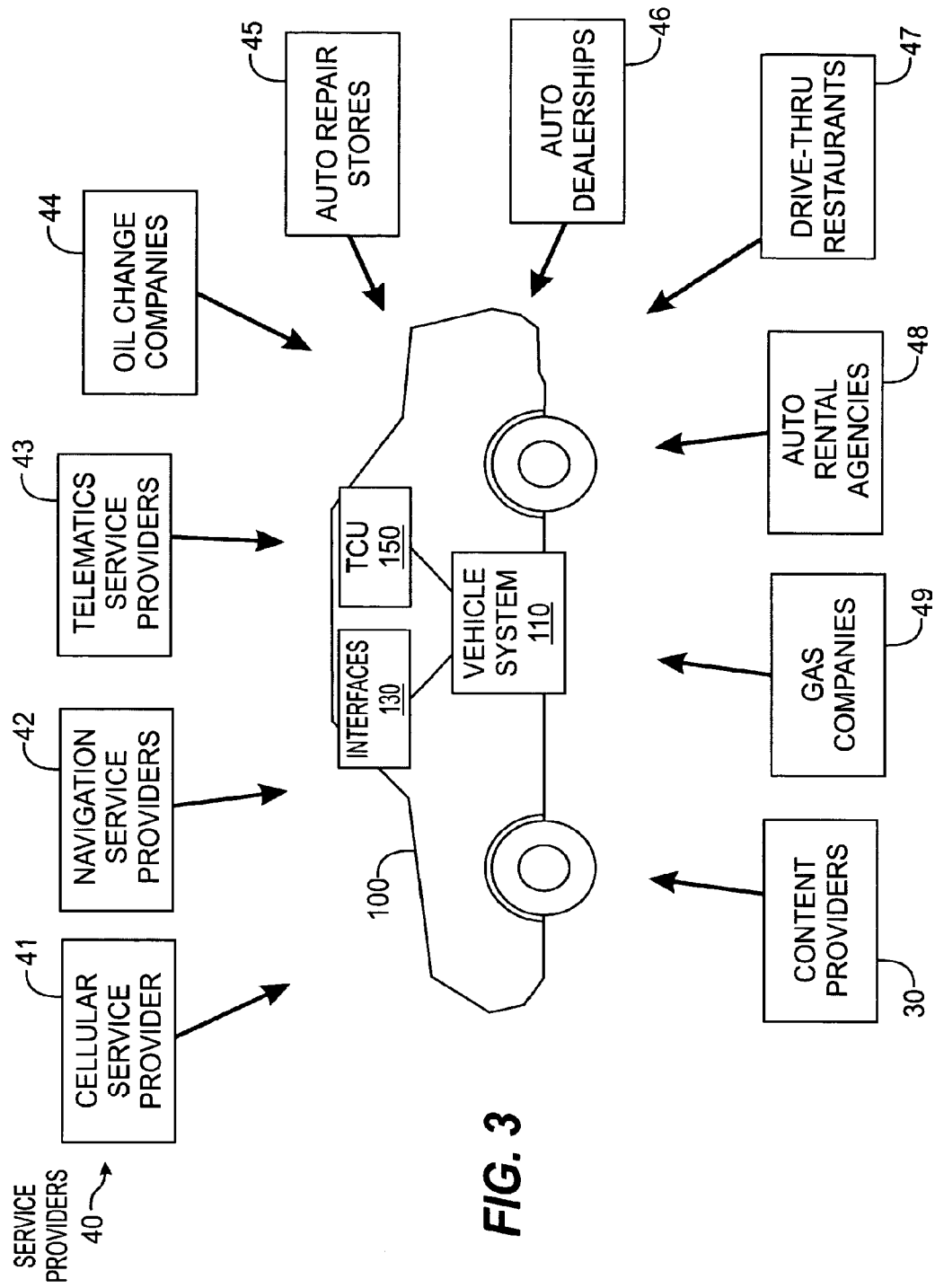
FIG. 3 illustrates a vehicle relative to a number of providers of services and content.

In FIG. 3, for example, some content providers 30 and service providers 40 that can provide content to the vehicle 100 are illustrated. The content providers 30 can include music and movie distributors, cable content providers, satellite content providers, Internet music providers, etc. Content from such providers 30 can be provided directly to the vehicle system 110 via the communication interfaces 130 or Telematics control unit 150. The service providers 40 can include cellular service providers 41, navigation service providers 42, Telematics service providers 43, oil change companies 44, auto repair stores 45, auto dealerships 46, drive-thru restaurants 47, rental agencies 48, gas companies 49, or any other provider of services associated with vehicles. Content from the service providers 40 can be provided directly to the vehicle system 110 or can be indirectly provided though a content provider 30 on behalf of the service provider 40. In exchange for vehicle information from the vehicle system 110, the providers 30 and 40 can offer content for free or at reduced cost as an incentive for vehicle owners and passengers to use the provider's products and services. The vehicle information can then be used for marketing and statistical purposes by the providers 30 and 40.

Figure 4:
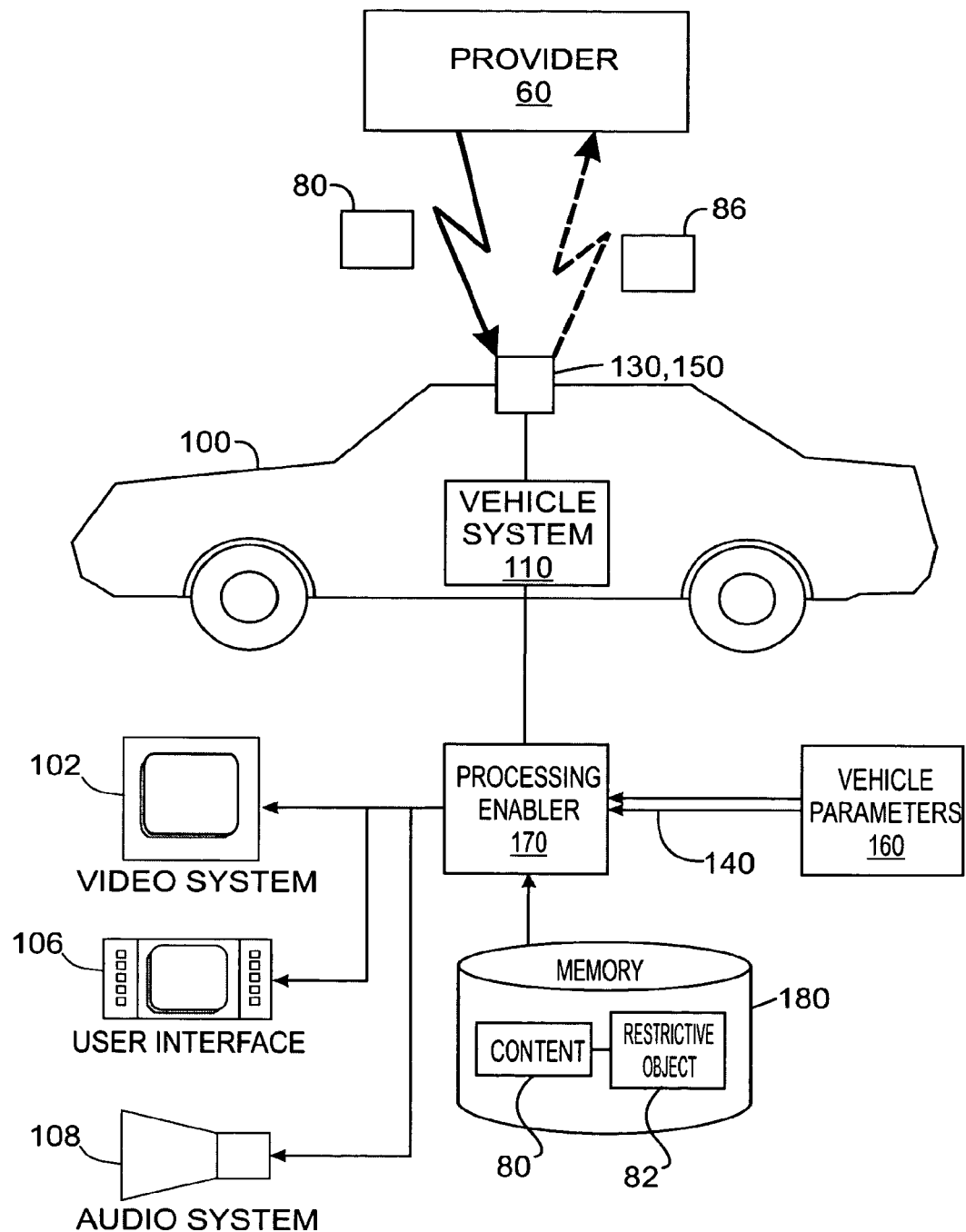
FIG. 4 illustrates a vehicle having a vehicle system with a possessing enabler for enabling or preventing processing of content.

To discuss providing restricted content to the vehicle system 110 in exchange for vehicle information in greater detail, reference is made to FIG. 4, which shows a provider or source 60 relative to a vehicle 100, a vehicle system 110, and other components. As discussed previously, the provider 60 transfers content 80 to the vehicle system 110 via a communication interface 130 or 150, for example, for storage and processing by the vehicle system 110. The provider 60, however, wishes to maintain some form of control over the provided content 80 by requiring certain information 86 to be transferred from the vehicle 100 in exchange for providing the content 80. The required information 86 is collected and transmitted by the vehicle system 110 according to the requirements of the provider 60.

In one example, the required information 86 can include vehicle conditions or parameters 160, such as the mileage, service records, GPS information, status, details of components, etc., of the vehicle 100. The vehicle conditions or parameters 160 are obtained by the vehicle system 110 and transferred to the provider 60. In another example, the required information 86 can include details of the vehicle system 110, such as its model, serial number, features, capabilities, preferences, upgrades, etc. In yet another example, the required information 86 can include details related to content stored on the system 110, such as the types of content, the vehicle owner's preferred genre, preferences, etc.

The exchange of content 80 and information 86 can be performed manually, and provisions can be made to make the vehicle owner and/or driver aware of information 86 being exchanged for the content 80. For example, a notice can be provided to the driver through a user interface, (e.g., a dashboard display 106 in FIG. 4), and the user can enter an approval in the interface for the exchange of information 86 in return for the content 80. Alternatively, the exchange of content 80 and information 86 can be performed automatically without intervention by the vehicle owner. For example, content 80 can be downloaded to the vehicle system 110 from a server or the like of the provider 60, and the vehicle system 110 can automatically transfer the requested information 86 as instructed using an appropriate interface 130.

In some situations where content 80 is exchanged for information 86, the source 60 can determine whether the vehicle information 86 meets the requirements for information restricting the content 80. This may be the situation when the content 80 is transferred to the vehicle system 110 in exchange for one transmission of information 86 from the vehicle system 110. Before the content 80 is transferred to the vehicle system 110, for example, the provider 60 sends a request for vehicle information. The vehicle system 110 obtains vehicle conditions or parameters 160 via the vehicle bus 140 in response to the request and transfers information 86 to the provider 60. In turn, the provider 60 determines if the returned information 86 meets their requirements. If so, the provider 60 transfers the content 80 to the vehicle system 110, and the content 80 is ready for processing, although it may still be restricted by conventional DRM schemes known in the art.

In other situations where content 80 is exchanged for information 86, the provider 60 can transfer the content 80 to the vehicle system 110. The vehicle system 110 then transfers information 86 to the provider 60. Rather than having the provider 60 determine if the information 86 meets the requirements, the vehicle system 110 determines whether the vehicle information 86 that is transferred to the provider 60 meets the requirements for information restricting the content 80. This may be the situation when the content 80 is transferred to the vehicle system 110 in exchange for a requirement of multiple or repeated transmissions of information 86 from the vehicle system 110.

To restrict the provided content 80, restrictive techniques are used to associate a restriction or DRM scheme to the content 80. As shown in FIG. 4, a restrictive object 82 can define the restriction. The restrictive object 82 is associated with the content 80 and is typically stored with the content 80 in memory 180. In general, the restrictive object 82 defines how, when, where, under what conditions, and/or by whom the restricted content 80 can be stored, processed, and/or transferred.

The restrictive object 82 can have any form known in the art. For example, the restrictive object 82 can be a file having scripted code specifying rights or requirements for a content processing device to be able to render or otherwise process the content 80. The restrictive object 82 can also have a decryption key that is required to decrypt the associated content 80. If the specified rights or requirements in the restrictive object 82 are met, the decryption key is available for decrypting the associated content 80 and allowing the decrypted content 80 to be processed. Otherwise, the decryption key is not available.

Several examples of providing restricted content 80 in exchange for vehicle information 86 is now discussed with reference to FIG. 4. In a first example, a navigation service provider 60 provides a version of its navigation software (i.e., content) 80 in exchange for GPS information 86 from the vehicle 100. The navigation software 80 may be offered for free or at a reduced price as an incentive to enlist participation from vehicle owners to give GPS information 86 to the navigation service provider 60. The GPS information 86 from the vehicle system 110 can be received by a central server (not shown) connected to a network. In turn, the GPS information 86 on the server can be used to formulate real-time traffic information and can be made available to the subscribers of the navigation service provider 60.

The vehicle owner can fill out a questionnaire or otherwise agree to allow GPS information 86 to be transmitted from her vehicle system 110 to the central sever of the provider 60. By doing so, the vehicle owner can satisfy requirements to procure the low cost or free version of the navigation software 80. The navigation software 80 is then downloaded to the vehicle system 110 using a communication interface 130. Once downloaded into memory 180, the navigation software 80 is restricted or protected by one or more requirements in the restrictive object 82 associated with it. A processing enabler 170 enforces the restrictions associated with the navigation software 80 by either enabling or preventing a content processing device, such as user interface 106, from processing the navigation software 80. The processing enabler 170 is discussed generally here as a component of the system 110. One skilled in the art, however, will appreciate that the processing enabler 170 involves various components, such as processing software, hardware, DRM information, and other components, for processing content under restrictions of a DRM scheme associated with the content.

In one example, the restriction in object 82 can require multiple or repeated transmissions of GPS information 86 from the vehicle system 110 in order for the navigation software 80 to be processed (i.e., to run applications of the software 80). To enforce such a restriction, the processing enabler 170 obtains the restriction from the object 82 and determines whether the requirement of the multiple or repeated transmissions of GPS information 86 have been met. In this context, information about transmissions of the information 86 may also be stored in memory 180, or the information can be obtained from elsewhere via the vehicle bus 140, for example.

If the transmission requirement is met, the user interface 106 is allowed to process the software 80 (i.e., run applications of the software 80). Depending on the restriction used, the processing enabler 170 preferably prevents the software 80 from being processed if the required transmissions are not performed or the software for monitoring and transmitting the vehicle information 86 is removed from the vehicle system 110.

In a second example of providing restricted content, a vehicle leasing or rental agency 60 offers media 80 as an added incentive to lease or rent a vehicle from the agency. When a consumer leases or rents the vehicle 100, the media 80 is transferred to the vehicle system 110 of the rental vehicle 100. In exchange for providing the media 80, the agency 60 can request that the consumer provide information 86 from the vehicle 100, and the media 80 is restricted by a requirement for the information 86 from the vehicle system 110. As long as the requirement for information 86 is met, the processing enabler 170 allows a content processing device, such as audio system 108, to process the media 80. For example, the required information 86 can include GPS information, navigation information, driving statistics, preferences of the consumer, mileage, average speed, or other information useful to the agency 60 or beneficial to the consumer in reducing rental or leasing rates. The media 80 can also be restricted by a time period of the rental or lease agreement, restricted for processing only on the designated vehicle system 110, and restricted by conventional DRM schemes known in the art.

In a third example of providing restricted content, a satellite radio provider 60 can provide access to encrypted satellite radio content 80 to vehicle owners willing to participate in traffic information studies or the like. The satellite radio content 80 requires decryption for it to be processed. The processing enabler 170 obtains a decryption key or the like from the restrictive object 82 associated with the satellite radio content 80 based on whether the vehicle system 110 is transmitting vehicle information 86 to the provider 60 or other external entity. The vehicle information 86 can include GPS or navigation information. In turn, the transmitted information 86 can be used for traffic reports or the like. For the restriction, the satellite radio content 80 may be processed for a predetermined period of time after a given transmission of the vehicle information 86 from the vehicle system 110 or may be processed only while vehicle information 86 is currently being transmitted.

In a fourth example of providing restricted content, an auto repair service provider 60 can offer media 80, such as music or other entertainment, as an incentive for using the auto repair service. The service provider 60 may actually obtain the media 80 from another provider, such as a music distributor through a predetermined arrangement. In exchange for providing the media 80 for download to the vehicle's system 110, the service provider 60 can request that the vehicle system 110 make at least one transmission of information 86 to the service provider 60 or another destination. The transmitted information 86 can include vehicle information 160, such as mileage, features, service history, etc., of the vehicle 100. This vehicle information 160 can then be used by the repair shop to send service reminders to their customers. If the vehicle system 110 has such vehicle information 160 stored in memory, it can provide it directly to the service 60. Otherwise, the system 110 can use the vehicle interface or OBD-II connection (not shown) and obtain the information 160 from the vehicle bus 140, which can be connected to the vehicle's internal computer and other components (not shown) having the vehicle information 160.

In other examples, the provider 60 can be a gas station that offers content 80, such as media, as an incentive for purchasing gasoline from the stations or can be a fast food company or other service that offers similar forms of incentives to vehicle owners. In addition, the provider 60 can be an automobile insurance company and auto part manufacturers that can provide content 80 to its customers in exchange for vehicle information 160, such as velocity, mileage, diagnostic trouble codes, etc. The vehicle information 160 can be collected for marketing or statistical analysis so such service companies can provide better products and services to customers.

In addition to controlling how content is provided to a vehicle, another technique of handling content for a vehicle previously summarized involves controlling under what conditions the content can be processed (e.g., decrypted, rendered, parsed, and streamed) in the vehicle. Continuing with reference to FIG. 4, content 80 is provided to vehicle system 110 by a provider or source 60. Rather than requiring the transfer of information 86 from the vehicle 100 as in the previous examples, the processing of the content 80 is restricted based on one or more conditions or parameters 160 of the vehicle 100.

In a similar fashion to the previous discussion of restricting the content 80, a restrictive object 82 having a restriction or DRM scheme is associated with the content 80. The restrictive object 82 can have any form known in the art and can be a file having scripted code specifying one or more restrictions or rights on whether a content processing device can process the content 80. The restrictive object 82 can also have a decryption key required to decrypt the associated content 80. Based on the specified restrictions in the restrictive object 82, the decryption key can be made available for decrypting the associated content 80 and allowing the decrypted content to be processed.

The restrictions in the object 82 can be similar to DRM schemes known in the art and can use various DRM standards, such as defined by the Open Mobile Alliance (OMA). To control the processing of the restricted content 80, the restriction or DRM scheme enables, prevents, or limits the content processing capabilities of the vehicle system 110 or content processing devices associated with the system 110. For standard media, such as audio and video, for example, the content processing capabilities include the ability to encode (e.g., MP3 encoders for audio capture), decode (e.g., MP3 decoders for audio play), render, parse, and stream certain types, files, or formats of media content. The content processing capabilities for media can also include the ability to transcode (e.g., functions for converting from MPEG2 to MPEG4) or otherwise convert one type, file, or format of media content to another type, file, or format. For other forms of content, such as software data and user interface data, the content processing capabilities include various processing requirements associated with the particular form of content, such as whether an application can be opened or run, whether a database file can be accessed, etc.

In this example, the restrictive object 82 enables, prevents, or limits processing of the associated content 80 by specifying particular vehicle related conditions or parameters 160 that restrict processing of the content 80. As before, the restricted content 80 is downloaded or otherwise transferred from the provider 60 to the vehicle system 110 using interfaces 130, for example. When the restricted content 80 is requested for processing, the processing enabler 170 obtains one or more vehicle conditions, parameters, or information 160 from the vehicle bus 140 or via peripheral components of the vehicle 100 and obtains the one or more restrictions in the object 82 associated with the content 80. Then, the processing enabler 170 enforces the restrictions by determining if the vehicle conditions 160 meet the restrictions in the restrictive object 82. Based on this determination, the processing enabler 170 may enable or prevent the content 80 from being processed and delivered in the vehicle 100 using an appropriate content processing device, such as a video display 102, a user interface 106, or an audio system 108, for example.

Because the system 110 has access to various vehicle conditions 160, the content 80 can be restricted in a number of ways. Accordingly, we now turn to a number of examples for restricting content 80 based on vehicle conditions 160.

In a first example, the content 80 is restricted to a certain amount of mileage on the vehicle 100. Thus, the restricting vehicle condition 160 pertains to the vehicle's mileage or the distance traveled by the vehicle 100. The vehicle system 110 can track the mileage traversed by the vehicle 100 using the GPS interface 132 and a GPS system (not shown), using the vehicle's odometer, or using other techniques or components. If the mileage 160 is at least below some predetermined mileage value associated with the restricted content 80, the processing enabler 170 allows the content 80 to be processed. If, however, the mileage 160 exceeds that predetermined value, the processing enabler 170 prevents the content 80 from being processed.

In a second example of restricting content 80 with vehicle conditions 160, a gas station as provider 60 purchases the rights to distribute a song 80 to customers as an incentive for consumers to purchase gas from the station. To be able to render the song 80, a restriction in the restrictive object 82 associated with the song 80 dictates that the song 80 can be rendered only during the time in which the vehicle 100 consumes the fuel purchased from the gas station. Thus, the restricting vehicle condition 160 pertains to the level of fuel consumption of the vehicle 100. If twelve gallons of fuel are purchased, for example, the restriction in the restrictive object 82 can indicate that the song 80 can be rendered in the particular vehicle 100 until the twelve gallons of fuel have been consumed.

The processing enabler 170 enforces this restriction by monitoring the fuel consumption 160 of the vehicle 100 from the time the song 80 is downloaded. When the song 80 is requested for processing in the vehicle 100, the processing enabler 170 compares the monitored amount of fuel consumption 160 with the specified amount in the restrictive object 82. If the monitored amount of fuel consumption is less than the specified amount, the content 80 can be processed and delivered in the vehicle 100 using an appropriate content processing device, such as audio system 108. Once the purchased amount of fuel has been consumed, however, the ability to render the restricted song 80 will no longer be valid, and the processing enabler 170 prevents the song 80 from being processed.

Alternatively, the restriction associated with the song 80 can dictate that the song 80 can be processed only for a particular amount of miles after the download. Thus, the restricting vehicle condition 160 pertains to the vehicle's mileage or the distance traveled by the vehicle 100. After the mileage limit is met by the vehicle 100, the ability to render the restricted song 80 will no longer be valid, and the processing enabler 170 prevents the song 80 from being processed. When rendered invalid, the vehicle system 110 may give the user the option to purchase the song 80 from a distributor or may remove the restricted song 80 from memory 180 to free up available space. To enable the user to purchase the song 80, the vehicle system 110 can provide a display (not shown) on the graphical user interface 106 for this purpose. The display can indicate that the free usage of the song 80 has ended and can provide an option for the user to purchase the song 80. If the user accepts the purchasing option, the vehicle system 110 can communicate credit card or account information stored on the system 110 to a content provider, such as internet music provider, using one of the communication interfaces 130. Information pertaining to the content provider can be associated with the song 80 in memory 180 when the song 80 is initially transferred to the vehicle system 80. Alternatively, the vehicle system 110 may independently store information on available content providers or can download that information separately.

In a third example, the restriction associated with the content 80 can limit processing of the content 80 to a predefined Vehicle Identification Number (VIN) or other vehicle identifier. Thus, the restricting vehicle condition 160 pertains to the VIN or other identifier of the vehicle 100. The processing enabler 170 obtains the VIN or identifier 160 from the computer system (not shown) of the vehicle 100 via the vehicle bus 140, for example. Then, the processing enable 170 determines whether the VIN matches a predefined VIN defined in the restrictive object 82 restricting the content 80. If they do match, then processing of the content 80 is allowed. Otherwise, processing of the content 80 is prevented.

In a fourth example, the restriction associated with the content 80 can limit processing of the content 80 to a predefined status of a vehicle component or system (not shown). Thus, the restricting vehicle condition 160 pertains to a status of a component or system of the vehicle 100. The processing enabler 170 obtains the status 160 of the component via the vehicle bus 140, for example. Then, the processing enabler 170 determines whether a current status of the vehicle component matches a predefined status defined in the restrictive object 82 restricting the content 80. If they do match, then processing of the content 80 is allowed. Otherwise, processing is prevented. For example, the vehicle system 110 can control processing of video content 80 in a dashboard interface 106 of the vehicle 100 based on a status of the transmission or an odometer speed of the vehicle 100. Processing of the video content 80 is not allowed in the dashboard interface 106 while the vehicle's transmission is in "drive" or if the odometer speed of the vehicle 100 is above a predefined speed. When the vehicle 100 is in neutral or park, or is under the predefined speed, the content 80 may be rendered on the dashboard interface 106.

In the previous examples, content 80 is restricted based on only one vehicle condition 160 at a time. However, content 80 can be restricted based on one or more vehicle conditions 160 simultaneously depending on a particular implementation. Some of the vehicle conditions 160 that can restrict processing of content 80 include, but are not limited to, a mileage amount, a fuel consumption amount, a fuel level, a speed, an amount of tire wear, a Vehicle Identification Number, a vehicle identifier, GPS information, a status of transmission of vehicle information, a status of a vehicle component, a number of ignition cycles, an engine temperature, a tire pressure, an oil pressure level, a voltage level, a diagnostic trouble code, and an indication of an occupied seat in a vehicle.

In addition to controlling how content is processed in a vehicle based on vehicle conditions described above, yet another technique of handling content in a vehicle involves controlling to whom in the vehicle the content can be processed or delivered. For example, content can be restricted to different types of potential users in a vehicle, such as the driver, the front seat passenger, or the rear seat passengers, for example. In addition, content can be restricted to specific locations of potential users in the vehicle and/or specific locations of devices in the vehicle for processing the content. For example, content can be restricted to whether a user is in a backseat passenger, whether the user is in a window location, or whether a device for processing the content is located in the front or back seat of the vehicle.

Figure 5:
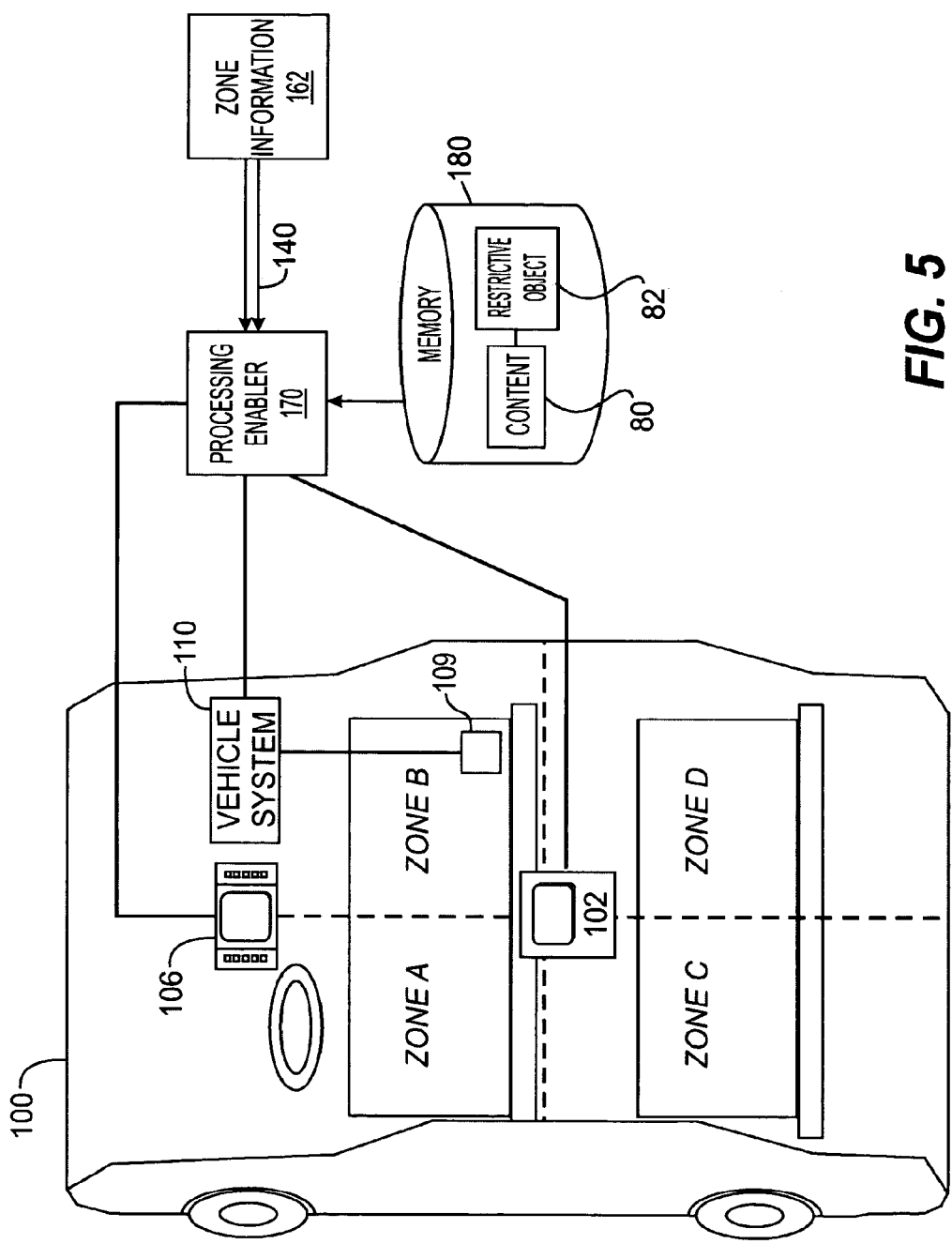
FIG. 5 illustrates a vehicle divided into zones for restricting processing of content in the vehicle.

Details of restricting content to locations or users in a vehicle are discussed with reference to FIG. 5. The vehicle 100 in FIG. 5 is divided into predefined zones that can be used to control the processing of content in the vehicle 100. The predefined zones in this example include zone A for the front seat driver side, zone B for the front seat passenger side, zone C for the backseat driver side, and zone D for the backseat passenger side of the vehicle. Larger or smaller vehicles may have more or fewer zones, and the zones may be combined or arranged in different combinations than shown in FIG. 5.

Processing of content 80 with the vehicle system 110 can be restricted to one or more of the predefined zones of the vehicle 100. Similar to previous discussions, restricting content 80 to predefined zones involves associating one or more restrictions or DRM schemes with the content. For example, the content 80 in this technique is restricted to a predefined zone of the vehicle 100 by a restrictive object 82. Vehicle information 160 is obtained via a vehicle bus 140, and a processing enabler 170 determines from the restrictive object 82 whether the vehicle information 160 will allow the restricted content 80 to be processed.

The restrictions in the restrictive object 82 include zone related information, which restricts or limits processing of the content 80 to specified zones in the vehicle 100. The vehicle system 110 enforces processing of the restricted content 80 based on the zone related information restricting the content 80. When processing of restricted content is requested, for example, the vehicle system 110 obtains zone information 162 of the vehicle 100. The zone information 162 can be an indication in which zone a device (e.g., 102 or 106) for processing the requested content 80 is located and/or an indication of which seats or zones are currently occupied by passengers. Then, the processing enabler 170 of the vehicle system 110 compares the zone information 162 obtained from the vehicle 100 with the zone related information restricting the content 80. From the comparison, the processing enabler 170 determines whether the restricted content 80 can be processed or not.

In one example, the zones A, B, C, and D of vehicle 100 can have dedicated content processing devices. For example, user interface 106 is dedicated to zones A and B in the vehicle 100, and a video display 102 is dedicated to zones C and D. Content 80 may be requested for processing in the vehicle 100 at the video display 102. The requested content 80 can be a feature film that is restricted from processing in zone A of the vehicle 100, which is the driver's area of the vehicle 100. Yet, processing of the feature film 80 may be allowed in any of the other zones B, C, and D. Because the feature film 80 is requested for processing at the video display 102, which is designated for zones C and D, the processing enabler 170 of the vehicle system 110 will enable processing of the film 80.

However, the feature film 80 may be requested for processing in the vehicle 100 at the user interface 106, which is shared by both zones A and B. In this situation, the processing enabler 170 of the vehicle system 110 may prevent the feature film 80 from being processed at the user interface 106, because the interface 106, although designated for allowed zone B, is also designated for zone A where processing is not allowed. Even though the feature film 80 will not be processed in this situation, processing can still be enabled based on a determination of other vehicle conditions or zone information. For example, the restriction associated with the feature film 80 can allow for processing and display of the feature film 80 at the user interface 102 if the vehicle's transmission is in "park" but not if it is in "drive," for example.

In addition to or in alternative to determining if a content processing device is designated for a particular zone restricting content, processing of restricted content 80 can be based on whether a particular zone of the vehicle 100 is currently occupied by a passenger. Continuing with the previous example of where the content is the feature film 80, the user interface 106 is shared by zone A and zone B in the front seat. Even though the feature film 80 is restricted from processing in the driver's zone A, the processing enabler 170 can determine whether zone B is currently occupied. Determining whether a zone is occupied can use techniques known in the art for detecting seat occupancy in the vehicle 100. For example, a sensor or other device 109 can determine the seat occupancy. If zone B is occupied, then the feature film 80 can be allowed for processing at the user interface 106 even though it shares restricted zone A. If zone B is not occupied, however, then the processing enabler 170 will not allow the featured film 80 to be processed and displayed at the user interface 106.

Different vehicles may have different zone configurations, and vehicles may have devices dedicated to different zones. In addition, there may be one or more shared devices in the zones of a vehicle. Accordingly, the restriction or DRM scheme associated with content 80 preferably accounts for a plurality of potential zone configurations for vehicles. The vehicle system 110 determines which of the preconfigured arrangements of zones in the restriction corresponds to an arrangement of zones or seats of the vehicle 100. Then, the vehicle system 110 can determine whether a given content processing device is designated for the predefined zone or whether that zone is occupied. In one technique to determine the corresponding arrangements of zones, the vehicle system 110 can use various sensors 109 in the vehicle 100 to determine the seat occupancy of the vehicle 100. Then, the determined occupancy can be used to map the zone configuration of the vehicle 100 and correlate it with one of the different zone configurations associated with the content 80.

In the present examples, zone information 162 pertaining to the specific zones of the vehicle 100 may already be known and stored in memory 180 so that the vehicle system 110 can readily access that information 162. In addition, zone information 162 pertaining to the location of content processing devices, such as video display 102 and user interface 106 in FIG. 5, in the vehicle 100 may already be known and stored in memory 180 so that the vehicle system 110 can readily access that information 162. This may be the situation where the content processing devices are installed in the vehicle 100 along with the vehicle system 110 when the vehicle is manufactured. This may also be the situation where the vehicle system 110 can be programmed with zone related information for devices installed in the vehicle 100. Alternatively, the vehicle system 110 can directly query such devices for zone related information if the devices are capable of responding to such a query. In some situations, however, a device for processing content in the vehicle may be a later installed device incapable of determining its location or may be a portable device that receives content from the vehicle system 110 via one of the communication interfaces available in the vehicle 100. For the vehicle system 110 to obtain zone related information for such devices, the vehicle system 110 can use techniques for locating devices in the vehicle 100, such as disclosed in U.S. patent application Ser. No. 11/288,475, entitled "Method and Device for Determining a Location and Orientation of a Device in a Vehicle" which has been incorporated herein by reference.

Figure 6:
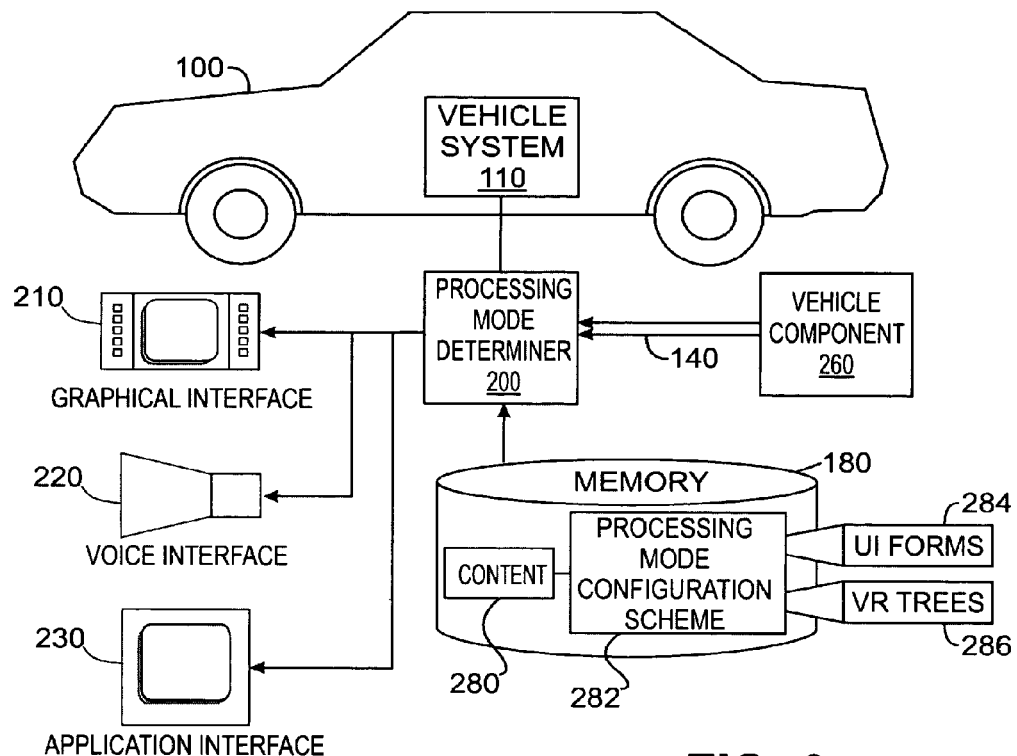
FIG. 6 illustrates a vehicle having a vehicle system with a possessing mode determiner for determining a mode of operation for processing content.

In addition to the previous examples of handling content in a vehicle, yet another technique of handling content involves modifying how content is processed during operation of a vehicle based on current vehicle conditions. Referring to FIG. 6, the vehicle system 110 has a processing mode determiner 200 and one or more content processing devices, such as a graphical interface 210, a voice interface 220, and an application interface 230. The processing mode determiner 200 is schematically shown in FIG. 6 as a separate component, but it will be appreciated that the determiner 200 can be part of the vehicle system 110 and/or the content processing devices 210, 220, and 230.

Content 280 is stored in memory 180. In this example, the content 280 can be a software application for a Telematics system, an entertainment system, a navigation system or user interface, and the content 280 can be processed by one or more of the content processing devices 210, 220, and 230. Although the content 280 in the present example is a software application, it will be appreciated, however, that the content 280 can be any of the other forms of content disclosed herein. A processing mode configuration scheme 282 is associated with the content 280 and is used to determine how the content 280 is to be processed. Although schematically shown in FIG. 6 as a separate element, it will be appreciated that the processing mode configuration scheme 282 can be part of the content 280 or can be part of an operating system on the vehicle system 110 that processes the content 280.

The processing mode configuration scheme 282 enables processing of the content 280 in at least two preconfigured modes of operation based on vehicle conditions. For example, the scheme 282 can define a first mode of operation for the content 280 that is used during "normal" operation of the vehicle 100, and the scheme 282 can define a second, altered mode of operation for the content 280 that is used when a specific vehicle condition exists. The second or altered mode of operation for the content 280 can involve reduced or increased functionality of the content 280 when processed or can involve altered processing of the content 280.

During operation of the vehicle 100, the vehicle system 110 monitors for one or more vehicle conditions, parameters, or information from the vehicle bus 140 or elsewhere. For example, the vehicle conditions can pertain to one or more components 260 of the vehicle 100. When processing of the content 280 is requested or the content 280 is currently being processed, the processing mode determiner 200 determines from the scheme 282 which of the preconfigured modes of operation for the content 280 has a vehicle condition that corresponds to the monitored vehicle information. Based on the determination, the processing mode determiner 200 allows the content 280 to be processed in the determined mode of operation. The appropriate content processing device 210, 220, or 230 then processes the content 280 according to the determined mode of operation.

For example, the content 280 can be a user interface application for the graphical user interface 210 of the vehicle 100. The user interface application 280 and scheme 282 has user interface (UI) forms 284 associated with them. Some UI forms 284 are configured for when one or more vehicle conditions exist (e.g., the vehicle transmission 260 is in "drive"), while other UI forms 284 are configured for when one or more other vehicle conditions exist (e.g., the vehicle transmission 260 is in "park"). The operating system, such as a Linux® operating system, runs on the vehicle system 110 and has an application manager, which operates the graphical user interface 210. The processing mode determiner 200, which can be part of the application manager of the operating system, selects the appropriate UI forms 284 for the graphical user interface 210 based on the detected vehicle conditions (e.g., the status of the transmission 260). Then, the selected UI forms 284 are used during processing of the user interface application 280 on the graphical user interface 210.

Figure 7A:
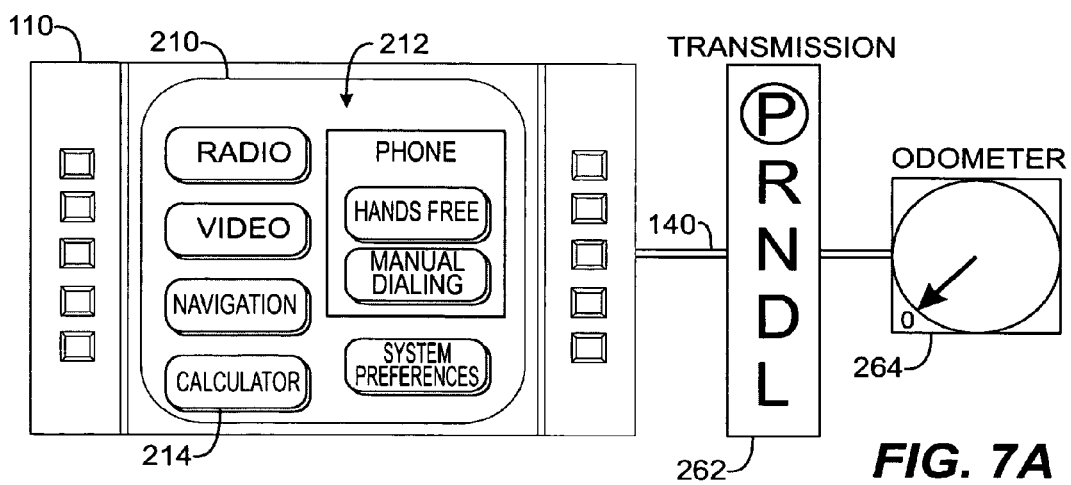
FIGS. 7A-7C illustrate examples of a graphical user interface of a vehicle system.
Figure 7B:
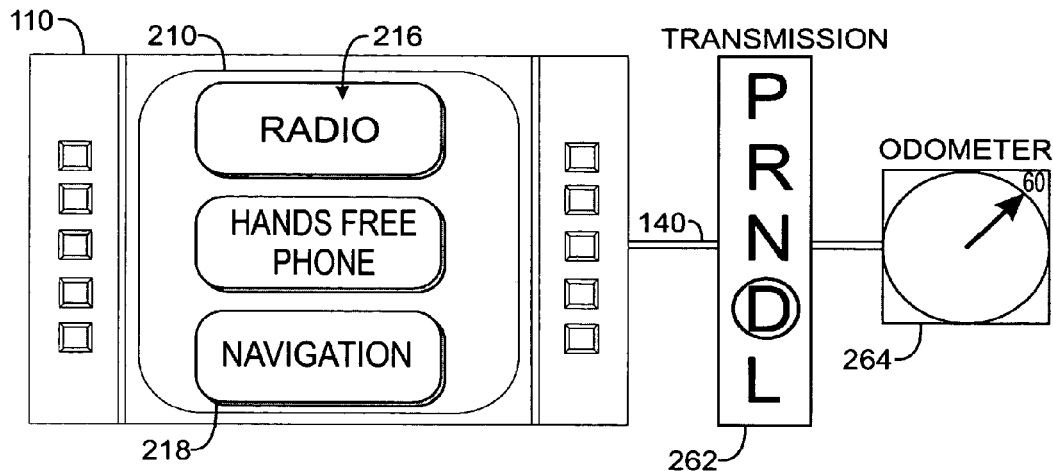
Figure 7C:
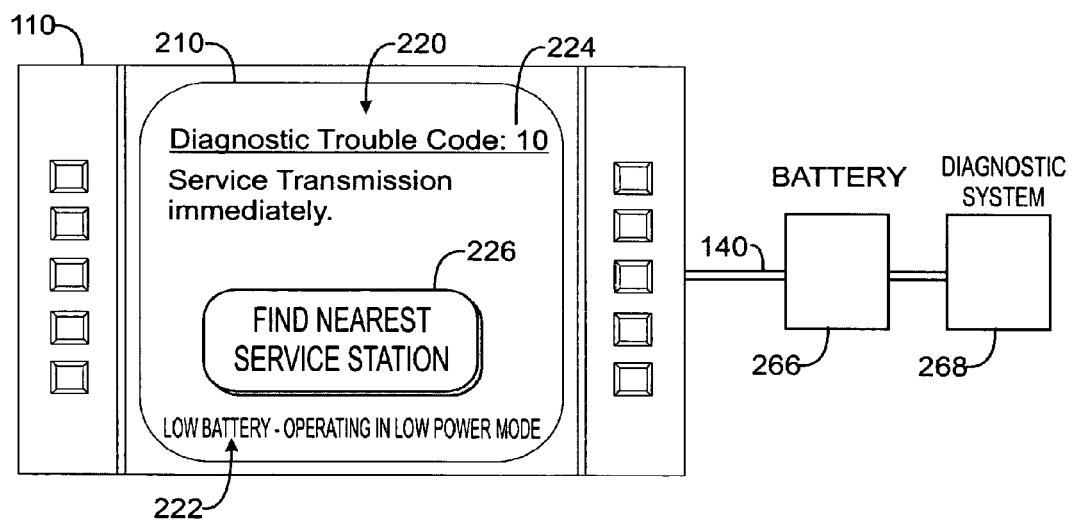

To illustrate an example of the above technique, FIGS. 7A-7C show a graphical user interface 210 of vehicle system 110 in conjunction with vehicle components 262 and 264. The graphical user interface 210 in this example is a touch screen display in the dashboard of the vehicle, but the techniques disclosed herein can be applied to any other interface or content processing device of a vehicle. Using the techniques disclosed above, features of the interface 210 are modified based on monitored vehicle conditions. In FIG. 7A, for example, the interface 210 has a "normal" menu 212 showing a plurality of touch screen buttons 214 for various functions of the vehicle system 110. The buttons 214 in this example permit access to radio controls, video controls, navigation controls, a calculator, phone controls, and system preferences. All of the buttons 214 are displayed in this "normal" menu 212 so that a driver can access the available features.

This "normal" menu 212 in the interface 210 corresponds to a first or "normal" mode of operation of a graphical user interface application. The "normal" mode of operation is preconfigured for one or more specific vehicle conditions, such as dictated by information pertaining to the vehicle transmission 262, the odometer 264, or other vehicle component. For example, the vehicle system 110 detects a status of the transmission 262 via the vehicle bus 140 and enables the interface 210 to display the "normal" menu 212 based on the detected status. In other words, the interface 210 can processes the graphical user interface application in a normal mode when the status of the transmission 262 is "PARK." In another example, the vehicle system 110 detects a speed from the vehicle's odometer 264 or the like via the vehicle bus 140, and the graphical user interface application is processed in a normal mode when the vehicle speed is below a predefined value.

When certain vehicle conditions exist, however, processing is modified, and the interface 210 is operated in an altered mode of operation. In FIG. 7B, for example, the interface 210 has an "altered" menu 216 showing selected touch screen buttons 218 to access radio controls, hands free phone controls, and navigation controls. These buttons 218 are displayed in this altered menu 216 so that a driver can access these various features based on whether the transmission 262 is not in "Park" or based on whether the speed from the odometer 264 of the vehicle is at or above a predefined value, for example.

When operated in the altered mode, the content displayed in the graphical user interface 210 is preferably simplified for the driver by reducing the number of selections on any particular screen to only those required by the driver while in motion. For example, a "calculator" application can be inaccessible in the altered operation of the interface 210 while the vehicle is in motion, and system preferences for configuring operation of the system can also be inaccessible. In addition, content displayed in the interface 210 in the altered mode of operation can have an increased size of displayed text, and the touch screen buttons 218 can be enlarged.

In other examples, the user interface application (i.e., content 280 and scheme 282) for the graphical user interface 210 can be configured to have different backgrounds, different coloring schemes, and different highlighting based on vehicle conditions. The graphical environment of the graphical user interface 210 can also be altered based on vehicle conditions by removing or changing the background wallpaper displayed on the home screen of the interface 210 or by providing a 2 or 3-dimensional environment on the user interface 210. In addition, back lighting of the graphical user interface 210 can be increased while the vehicle 100 is in motion to accommodate for effects of lighting and shadow. These and other modifications are suitable for the altered mode of operation based on vehicle conditions.

FIG. 7C shows another example of an altered mode of operation for the graphical user interface 210. Again, the vehicle system 110 can monitor or detect conditions of components 266, 268 of the vehicle via the vehicle bus 140 and can determine the mode of operation for the software application for the interface 210 based on those detected vehicle conditions. Some of the conditions of vehicle components that can be monitored include, but are not limited to, a mileage amount, a speed, a voltage level, an engine temperature, an oil pressure, a fuel level, a tire pressure, an amount of tire wear, an amount of time from vehicle service, and a diagnostic trouble code.

For example, the vehicle system 110 can detect the voltage level of the vehicle battery 266 via the vehicle bus 140. If the voltage level drops below a certain level, the vehicle system 110 enters a low power state. Accordingly, the interfaces 210 and other components of the system 110 enter a power-saving mode to reduce power consumption, as indicated by message 222 in the interface 210. In addition, the vehicle system 110 can detect the diagnostic trouble codes from the vehicle's diagnostic system or computer 268 via the vehicle bus 140. When a particular diagnostic trouble code is detected, the vehicle system 110 can automatically enable a diagnostic application of the vehicle system 110 to provide the driver with information about the code, as indicated by message 224 in the interface 210. Furthermore, the vehicle system 110 can automatically enable a navigation application to determine travel routes to a service station or dealership. For example, message 226 is a touch screen button that can access the travel route of the navigation application to show where repairs can be made to the vehicle.

The examples of FIGS. 7A-7C focus on modifying the processing of a user interface application for a graphical user interface of a vehicle based on vehicle conditions. However, modifying the processing of content based on vehicle conditions can also be applied to a voice interface application for a voice interface of a vehicle. For example, the vehicle system 110, as shown in FIG. 6, can have a voice interface 220, and a voice interface application 280 that supports Voice Recognition (VR) techniques operated on the vehicle system 110. The voice interface application 280 and scheme 282 for voice interface 220 is configured with VR trees 286, which represent a hierarchical arrangement or tree structure of voice commands, options, and responses for operating the voice interface 220. Some VR trees 286 for the interface 220 are configured for a normal mode of operation, while other VR trees 286 are configured for an altered mode of operation. Vehicle conditions, such as transmission status, vehicle speed, voltage level, diagnostic trouble codes, etc. of vehicle components 260, can be monitored and used to determine which of the VR trees 286 to be used during operation of the voice interface 220. For example, the voice interface 220 can provide VR trees 286 having different or fewer options for voice commands in an altered mode of operation when the vehicle is in "DRIVE" or when it is traveling above a predetermined speed.

In another example, the vehicle system 110 can have both a graphical user interface 210 and a voice interface 220 as shown in FIG. 6, and software applications or other content 280 for the vehicle system 110 can be configured to operate in either a graphical mode or a voice mode of operation based on vehicle conditions. For example, graphical UI forms 284 of the content 280 can be delivered by the graphical user interface 210 when the vehicle is in "PARK" or traveling below a predefined speed and can be delivered by the voice interface 220 when the vehicle is in "DRIVE" or is traveling above the predefined speed. In such an example, the voice interface 220 can provide VR trees 286 having different options for voice commands in an altered mode of operation. These different options in the VR trees 286 can be designed to compensate for options unavailable from modified or simplified graphical UI forms 284 of graphical user interface 210 during the altered mode of operation. In this way, the voice interface 220 and the graphical interface 210 can give the user the same functionality by providing alternate voice or graphical options in the graphical UI forms 284 and VR trees 286 based on vehicle conditions.

The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A computer-implemented method for providing content to users of an automotive environment, the method comprising:
receiving, at a control unit mounted in a vehicle via a long-range communication link, content for presentation in the vehicle, the content provided with a restrictive element that includes an indication of operating conditions of the vehicle for presenting the content in the vehicle and a mechanism for allowing the content to be presented;
determining, by the control unit via one or more vehicle sensors, a current operating condition of the vehicle;
determining, by the control unit, a time period for presenting the content based on the indicated conditions and the current operating condition of the vehicle; and
in response to the indicated conditions being satisfied, presenting, by the control unit via a user interface or an audio system communicatively coupled to the vehicle, the content according to the determined time period.

2. The computer-implemented method of claim 1, wherein the received content is compatible with a communication interface of the vehicle.

3. The computer-implemented method of claim 1, wherein the content is not presented until the indicated conditions are met.

4. The computer-implemented method of claim 1, wherein the content is only partially presented until all of the indicated conditions are met.

5. The computer-implemented method of claim 1, wherein the current operating condition of the vehicle is based on diagnostic information of the vehicle.

6. The computer-implemented method of claim 1, wherein the indicated operating conditions include one or more of: a current speed, an engine status, a current location, a number of passengers in the vehicle, or vehicle fuel consumption.

7. A vehicle system, comprising:
one or more communication interfaces;
a control unit mounted in a vehicle communicatively coupled to the one or more communication interfaces;
a non-transitory computer-readable memory communicatively coupled to the control unit and storing thereon instructions that, when executed by the control unit, cause the vehicle system to:
receive, via the one or more communication interfaces, content for presentation in the vehicle, the content provided with a restrictive element that includes an indication of operating conditions of the vehicle for presenting the content in the vehicle and a mechanism for allowing the content to be presented;
determine, via one or more vehicle sensors, a current operating condition of the vehicle;
determine a time period for presenting the content based on the indicated conditions and the current operating condition of the vehicle; and
in response to the indicated conditions being satisfied, present, via a user interface or an audio system communicatively coupled to the vehicle, the content according to the determined time period.

8. The vehicle system of claim 7, wherein the received content is compatible with the one or more communication interfaces.

9. The vehicle system of claim 7, wherein the content is not presented until the indicated conditions are met.

10. The vehicle system of claim 7, wherein the content is only partially presented until all of the indicated conditions are met.

11. The vehicle system of claim 7, wherein the current operating condition of the vehicle is based on diagnostic information of the vehicle.

12. The vehicle system of claim 7, wherein the indicated operating conditions include one or more of: a current speed, an engine status, a current location, a number of passengers in the vehicle, or vehicle fuel consumption.

13. A non-transitory computer-readable memory communicatively coupled to a control unit mounted in a vehicle and storing thereon instructions that, when executed by the control unit cause the control unit to:

receive, via a long-range communication link, content for presentation in a vehicle, the content provided with a restrictive element that includes an indication of operating conditions of the vehicle for presenting the content in the vehicle and a mechanism for allowing the content to be presented;

determine, via one or more vehicle sensors, a current operating condition of the vehicle;

determine a time period for presenting the content based on the indicated conditions and the current operating condition of the vehicle; and in response to the indicated conditions being satisfied, present, via a user interface or an audio system communicatively coupled to the vehicle, the content according to the determined time period.

14. The computer-readable memory of claim 13, wherein the content is only partially presented until all of the indicated conditions are met.

15. The computer-implemented method of claim 1, wherein the restrictive element includes a timing or a manner in which the content is presented.

* * * * *